United States Patent [19]
Huntley et al.

[11] Patent Number: 5,275,255
[45] Date of Patent: Jan. 4, 1994

[54] INTEGRATED CONTROLS AND SEATING CONFIGURATION FOR REACH-FORK VEHICLES

[75] Inventors: Robert R. Huntley, Greene; Isaac Avitan, Vestal; Eugene Helmetsie, Spencer, all of N.Y.

[73] Assignee: Raymond Corporation, Greene, N.Y.

[21] Appl. No.: 832,518

[22] Filed: Feb. 7, 1992

[51] Int. Cl.⁵ .................. B62D 33/063; B62D 33/073
[52] U.S. Cl. .................................. 180/326; 180/329; 180/330; 180/331
[58] Field of Search ............... 180/326, 329, 330, 331, 180/332, 333, 334, 315, 316, 317

[56] References Cited

U.S. PATENT DOCUMENTS 2,604,925 7/1952 Swift ................................. 180/330
4,730,691 3/1988 Grigg ................................ 180/329

FOREIGN PATENT DOCUMENTS

535619 11/1955 Italy ................................... 180/329
10290 of 1909 United Kingdom ................ 180/330

Primary Examiner—Mitchell J. Hill
Attorney, Agent, or Firm—Salzman & Levy

[57] ABSTRACT

The present invention features an integrated control and seating system for a material handling vehicle. The system includes a pair of control handles integrated into the control arms within an operator's compartment. Additionally, the operator seat can be oriented in several ways. It is also vertically adjustable to achieve the greatest operator comfort. Adjustable arm rests are also provided. The result is that the operator can comfortably access the controls while seated, leaning or standing, to allow the vehicle to be used in a number of ways.

3 Claims, 7 Drawing Sheets

INTEGRATED CONTROLS AND SEATING CONFIGURATION FOR REACH-FORK VEHICLES

FIELD OF THE INVENTION

The invention relates to an adjustable seat and arm rest system for material handling vehicles containing new and improved controls for a fork lift vehicle, and more particularly to a seat and arm rest configuration for a reach-fork vehicle which is integrated with new ergonometric controls. The new integrated system allows an operator to control the material handling vehicle in either a seated, crouching or standing position, facing and operating the vehicle in either a tractor first or fork first direction.

BACKGROUND OF THE INVENTION

Anyone who has ever observed the operation of, or who has actually operated a fork lift vehicle will appreciate the complexity of the various control levers for achieving the movement of the fork arms, the operator compartment, and/or the travel movement of the vehicle itself. The present invention has a simplified, ergonometric, control system having the majority of its controls in two handles. This control system has the great advantage of being ergonometrically efficient. That is, the vehicle is easy to operate. Reference is made to copending U.S. patent application Ser. No. 07/802,171, filed Dec. 4, 1991, in which the ergonometric controls are explained in more detail. The teachings of the copending application are incorporated herein by reference.

One of the added advantages of a fewer number of controls is the further capability for mounting these controls in a more efficient manner. The present invention now provides controls that can be configured as an integrated part of the seat arm rests of the vehicle. In this manner, an efficient, integrated combination of controls and seating system is made possible. The seating arrangement itself is also improved as a result of the ergonometric design, thus allowing the operator to assume various standing, crouching or seated positions heretofore unavailable with standard seating arrangements.

The integrated control and seating system provides another desirable feature for the operator, wherein the vehicle can be operated while the operator faces either a tractor first or fork first direction.

It is not uncommon for fork lift operators to complain that their hands, feet and/or back hurt after a normal operating shift. The integrated system of this invention provides additional operating positions, thus reducing the possibility of operator discomfort.

In standard control systems, levers are remotely located about the operator compartment, and require an extended reach for access. Obviously, there is wasted motion moving from one lever to the next. Some typical controls that are presently in use require extended push or pull movements to actuate the desired vehicle functions. All of these excessive operator movements and inconveniences of control access cause operator fatigue, operator cumulative trauma disorders such as carpal tunnel syndrome, and operating inefficiencies. In addition, these extraneous movements threaten safe vehicle operation.

The present invention reduces or eliminates these added motions, since most of the controls are at the finger tips of the operator. Also, because the controls are now part of the arm rests of the seat, they may be swiveled or moved with the arm rests to accommodate the operator's comfort zone. The operator can now change his position to either a standing, seated or crouching profile. The seat itself can fold up or fold down to accommodate the facing directions and/or positions and directions assumed by the operator in operating the vehicle.

In conclusion, the invention provides a versatile control and seat configuration for material handling vehicles, which configuration provides ease and efficiency of operation of the vehicle.

DISCUSSION OF RELATED ART

In U.S. Pat. No. 4,478,308, issued to Klaassen on Oct. 23, 1984, for "Industrial Vehicle Having An Adjustable and Pivotable Armrest", a seat and control system is illustrated in which the seat is adjustable to provide easy ingress and egress of the seat. This patented seating system does not position the arm rests for the purpose of operating the vehicle in a stand-up position, or in a crouched position. Neither is it taught that the seat may fold up or fold down to accommodate standing or crouching positions for the operator, or for allowing an operator to face and operate the vehicle in a tractor first direction as well as in a fork first direction.

SUMMARY OF THE INVENTION

In accordance with the present invention, there is provided an ergonometric control system integrated with a seating system of a material handling vehicle. The system comprises a pair of control handles that have been integrated into the seat arm rests of the seating system. The handles are utilized to control the movements of the vehicle, as well as to control the functions of the fork lift. The handles conform to the respective right and left hand grips of the operator. Each handle comprises a plurality of closely spaced, easily accessed, function actuators that allow for simultaneous control of two or more vehicular functions. All the actuators are integrated into their respective handle, such that they are within finger tip reach of the operator's hand. Each of these control handles is disposed on a respective arm rest of the seating system. Each arm rest pivots to allow the operator to assume different operating positions. In other words, the operator can access the controls while seated, crouched, or standing. In addition, the seat itself can fold down or fold up to accommodate the operator in facing the direction (tractor first or fork first) in which the vehicle is moving.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a new, integrated ergonometric control and seating system for a material handling vehicle, such as a fork lift truck. The integrated system of the invention is user friendly. The controls have been designed to be part of the seating system. The seat is foldable, providing different operator positions for purposes of ease and comfort of vehicular operation.

For purposes of clarity and brevity, like components and elements will bear the same designation throughout the figures.

Figure 1:
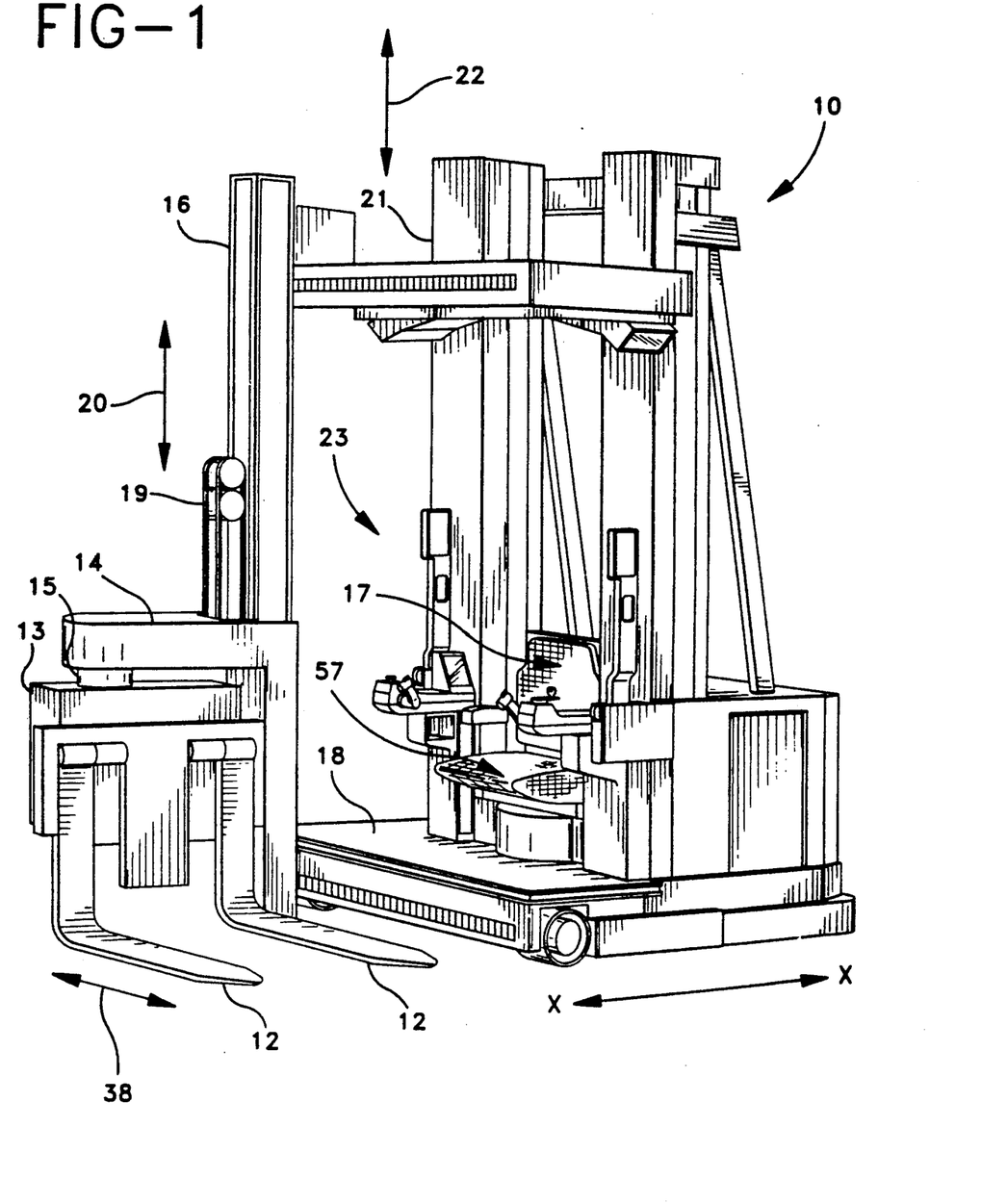
FIG. 1 is a perspective view of a swing-reach type material handling vehicle featuring the integrated ergonometric controls and seating system of this invention, viewed from the forks side.

Now referring to FIG. 1, a swing-reach truck 10 is shown. An operator, not shown, can sit or stand at the ergonometric controls of this invention. The ergonometric controls are included in an operator compartment 23. The swing-reach truck 10 is a typical type of material handling vehicle that may be driven and operated bidirectionally along axis x—x. It can benefit from the integrated ergonometric control and seating system of this invention. It is to be understood that this vehicle is one of many vehicles that can utilize the invention, and is displayed herein by way of example.

The swing-reach truck 10 comprises a pair of forks 12 that are carried upon a rotatable frame 13. The rotatable frame 13 is rotatively connected to extension arm 14 via a rotating shaft 15.

Extension arm 14 is vertically movable upon a first mast 16 via a chain drive 19, and thus carries the forks 12 up and down (arrow 20).

An operator platform 18 can carry an operator sitting in a chair unit 17. Chair unit 17 contains a seat 57. Platform 18 is likewise movable up and down (arrows 22) via a second mast 21.

Figure 2:
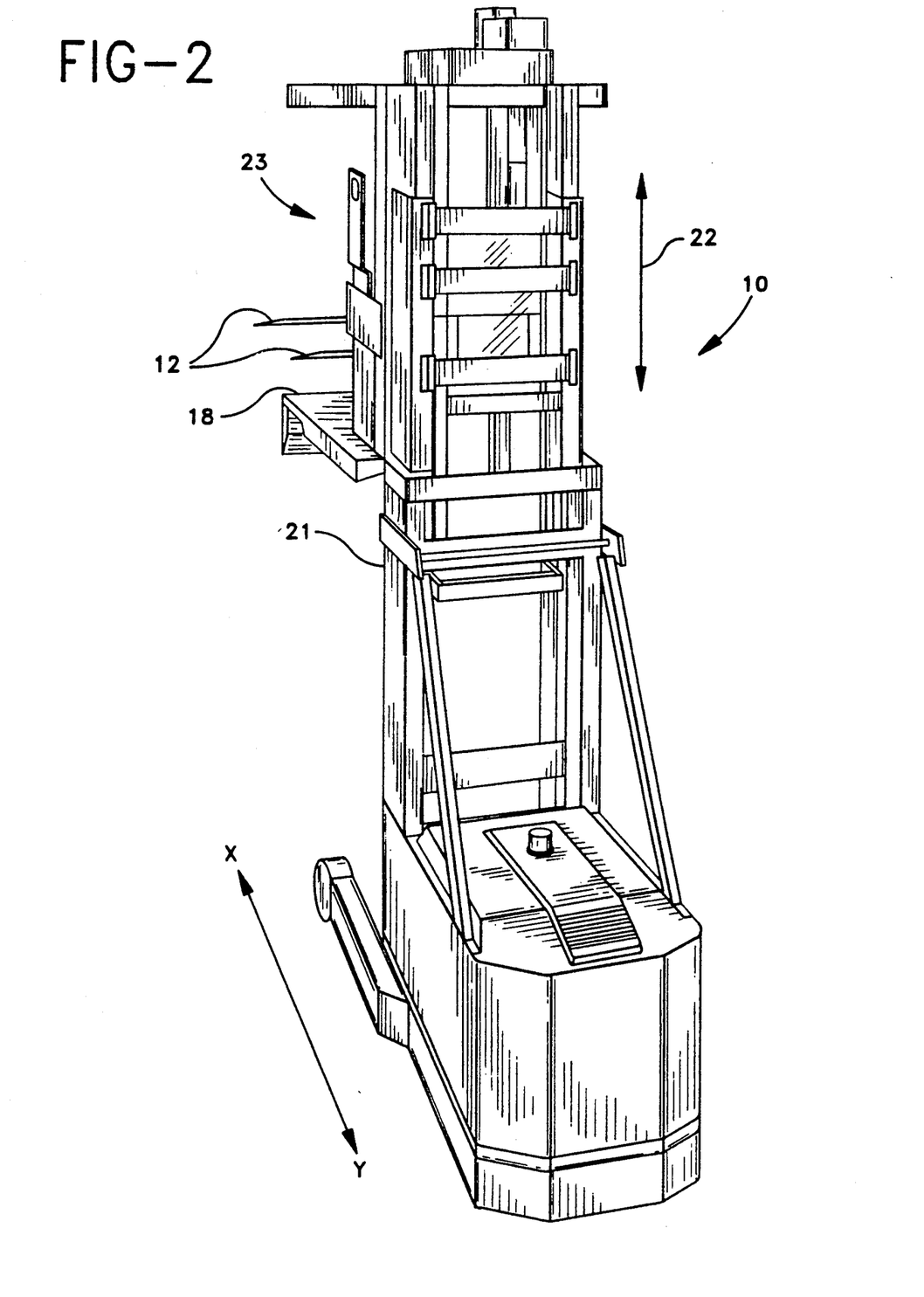
FIG. 2 is a perspective view of the swing-reach type material handling vehicle of FIG. 1, as viewed from the tractor side, with the main mast extended.

FIG. 2 depicts the vehicle 10 in the tractor first direction, with the platform 18 in an extended position upon main mast 21. The operator compartment 23 of the swing-reach vehicle 10 has sufficient room for the operator to stand, rather than sit.

Figure 3A:
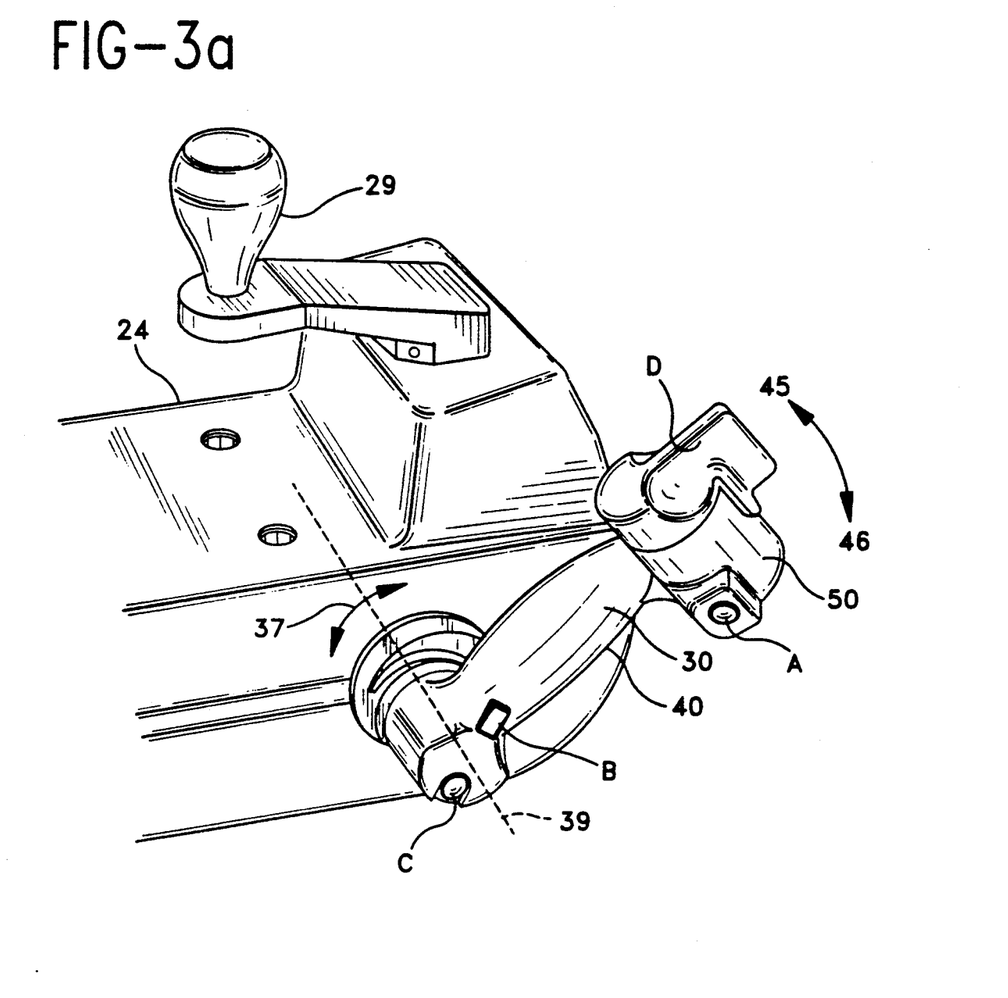
FIG. 3a and 3b are enlarged perspective views of the left and right control mechanisms, respectively, from the point of view of a seated or standing operator facing the forks.
Figure 3B:
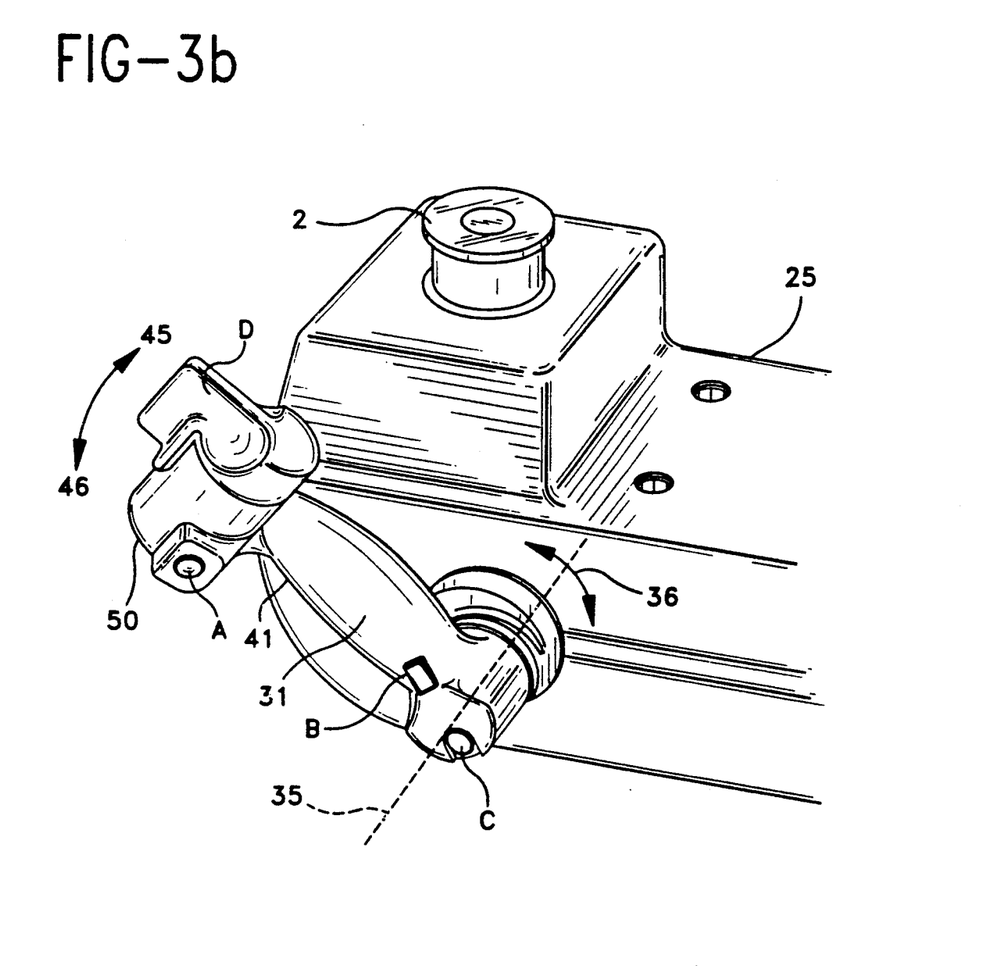

Referring to FIGS. 3a and 3b, the control handles 30 and 31 are shown looking outward from the seated position in chair unit 17 (FIG. 1). The control handles 30 and 31 are shaped to conform to the grip of the operator. The respective contoured surfaces 40 and 41 conform to the clenched hands of the operator, and provide a comfortable grasp of the control handles 30 and 31, respectively. This is important, because these handles serve to support the operator during the operation and movement of the vehicle 10.

Also, when the operator desires to drive the fork lift vehicle 10 in either a tractor first mode or a forks first mode, the right handle 31 will be pivoted (arrows 36) about axis 35. Likewise, when the forks 12 are desired to move laterally (arrows 38, FIG. 1) with respect to the platform 18, control handle 30 is pivoted (arrows 37) about axis 39.

By integrating the control handles 30 and 31 in the arms 24 and 25 of the chair unit 17, it is possible to operate the vehicle 10 in various positions.

Figure 4:
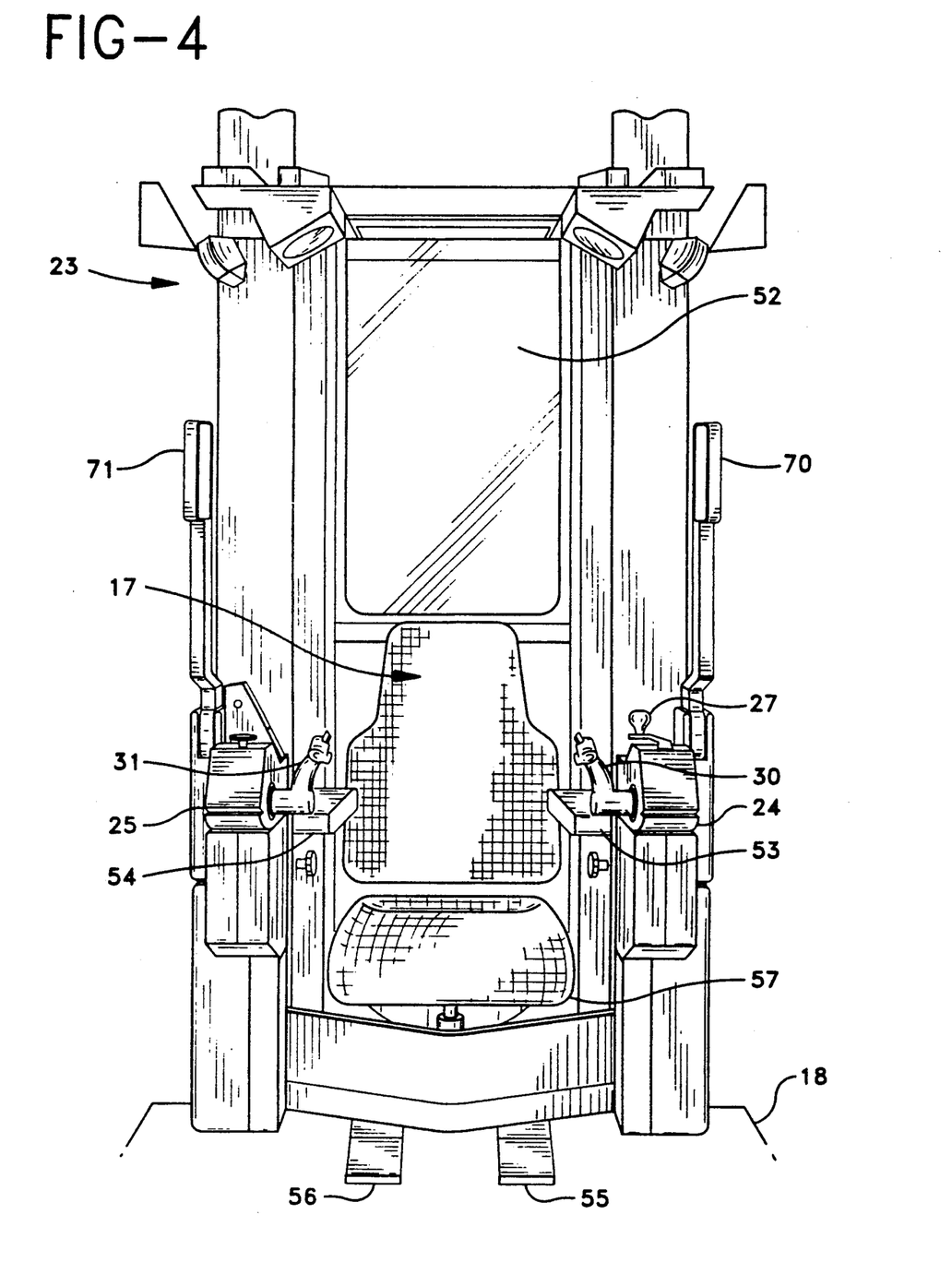
FIG. 4 is a frontal view of the operator compartment with the seat and control arms oriented horizontally (down position)
Figure 5:
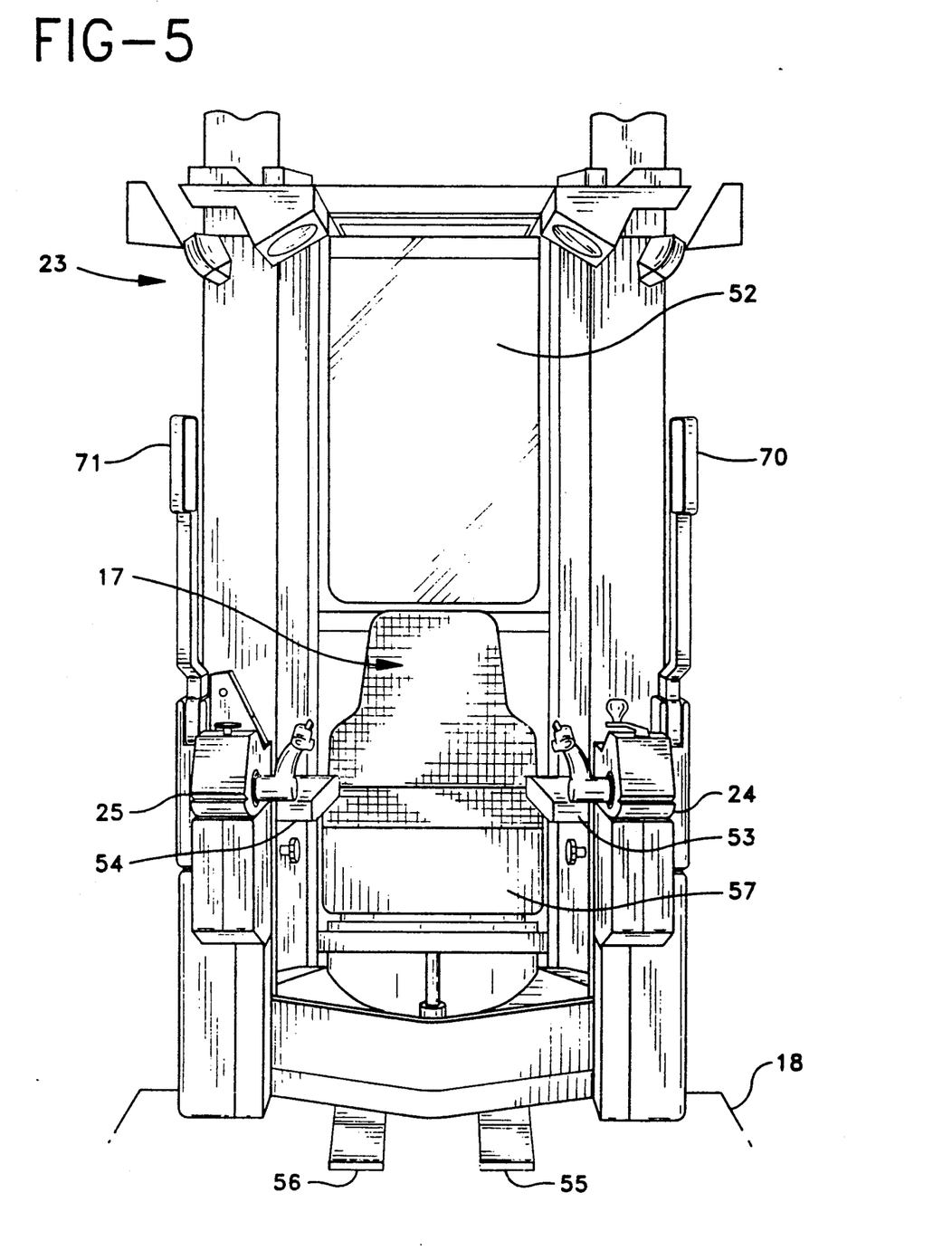
FIG. 5 is a frontal view of the operator compartment with the control arms down and the seat oriented vertically (up position)
Figure 6:
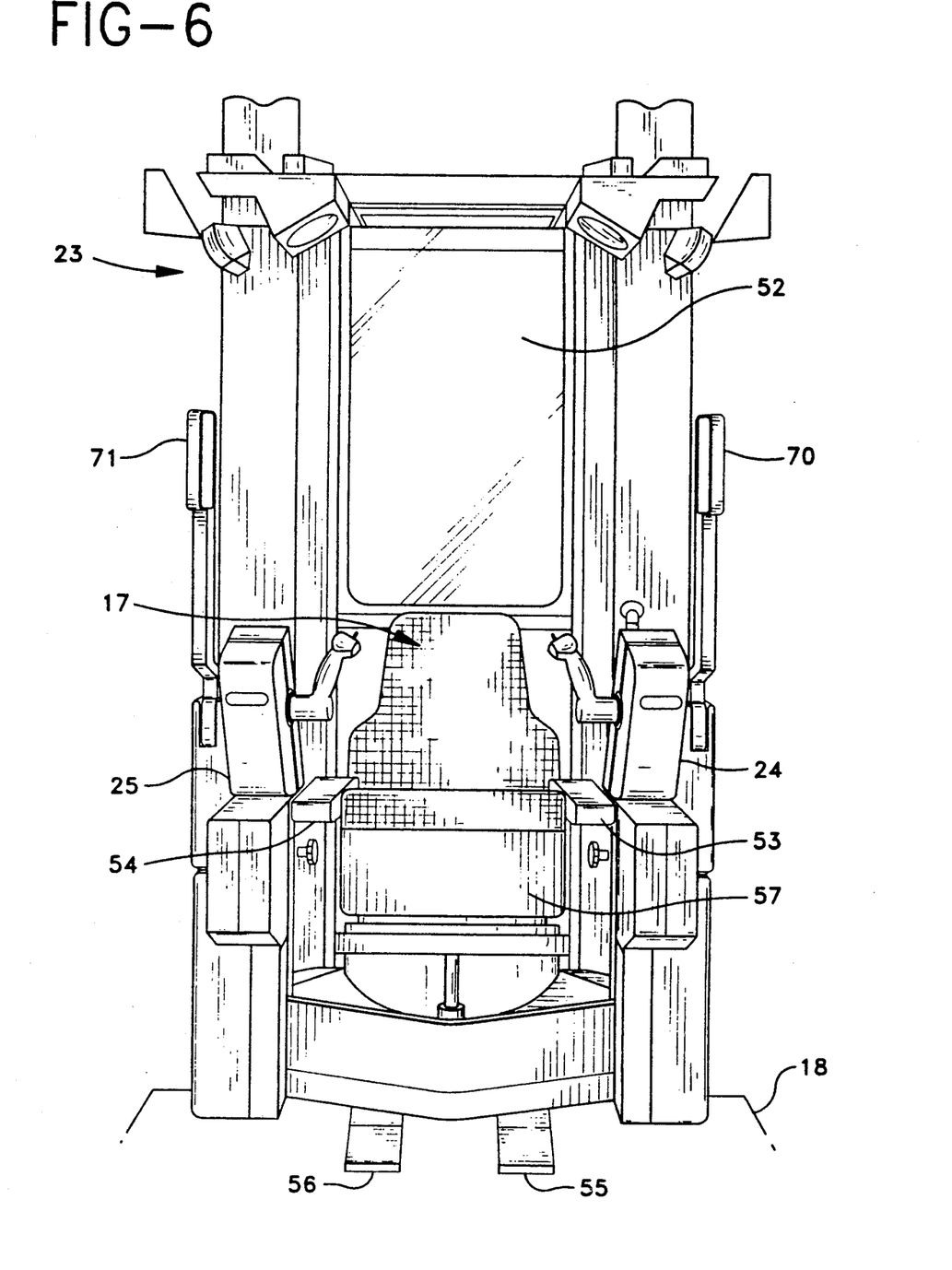
FIG. 6 is a frontal view of the operator compartment with seat up and control arms up at approximately 45°.

Referring now also to FIGS. 4, 5 and 6, there are shown the control arms 24 and 25 and seat 57 various orientations. An operator can operate the vehicle 10 in a seated position while facing the forks 12. In this orientation, the seat 57 and control arms 24 and 25 are in the down position, as shown in FIG. 4.

An operator can also operate the vehicle 10 in a sit/stand leaning position, wherein the operator sits on the upright folded seat 57, as shown in FIG. 5, thus lessening the weight on his legs. Further, it should be understood that control arms 24 and 25 are in the down position. In this position, the vehicle 10 would normally be operated in the forks first direction.

Also, an operator can operate the vehicle 10 in a standing position, wherein the seat 57 and control arms 24 and 25 are all folded upright, as shown in FIG. 5. In this position, the vehicle 10 can be operated in both directions (i.e., tractor leading or forks leading).

Also shown in FIGS. 4, 5 and 6 are: arm rests 53 and 54; deadman pedals 55 and 56; side gates 70 and 71; and window 52. Arm rests 53 and 54 and seat 57 are all vertically adjustable to suit the operator's physique and comfort. Deadman pedals 55 and 56 are required safety interlocks, designed to prevent operation of the vehicle 10 whenever they are not depressed. Side gates 70 and 71, shown in the upright position, are fold-away side access barriers, which can also be interlocked with the operation of the vehicle 10. Window 52 provides visibility for the operator while operating the vehicle 10 in the tractor first direction; it also acts as a barrier.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the current invention, what is desired to be protected by Letters Patent is presented by the subsequently appended claims.

What is claimed is:

1. An integrated control arm and seating system for a material handling vehicle, such as a forklift truck, comprising:

a combination of a foldable, integrated seat and a control arm disposed within an operator compartment carried by a material handling vehicle, said seat being foldable to assume three different seat positions, a first upright seat position for sitting, a second fold-down seat position for standing, and a third intermediate seat position between said fold-down and upright seat positions for crouching, said three different seat positions for allowing an operator of said material handling vehicle to operate said material handling vehicle in a tractor-first or a fork-first mode, said operator compartment additionally having respective right and left control arms being independently, pivotally movable with respect to said seat, to three different arm positions, a first upright arm position for sitting, a second fold-down arm position for standing, and a third intermediate arm position between said upright and fold-down arm positions for crouching, said pivotally movable control arms for assisting said operator to operate the vehicle from a standing, seated or crouching position; and respective right and left control handles integrally supported by said respective right and left control arms, said handles being disposed about said respective control arms for providing control of vehicular functions, said respective right and left control handles conforming to respective right- and left-hand grips of a vehicle operator.

2. The integrated control arm and seating system for a material handling vehicle in accordance with claim 1, wherein intermediate seat and arm positions are approximately at 45°.

3. The integrated control arm and seating system for a material handling vehicle in accordance with claim 1, wherein said right and left control handles are each pivotable through an arc of travel with respect to their respective control arms.

* * * * *